United States Patent
Yasuda et al.

(10) Patent No.: US 7,601,670 B2
(45) Date of Patent: *Oct. 13, 2009

(54) CATALYST POWDER, EXHAUST GAS PURIFYING CATALYST, AND METHOD OF PRODUCING THE CATALYST POWDER

(75) Inventors: Hirofumi Yasuda, Yokosuka (JP); Katsuo Suga, Yokohama (JP); Masanori Nakamura, Yokosuka (JP); Hironori Wakamatsu, Yokohama (JP); Kazuyuki Shiratori, Yokohama (JP); Toru Sekiba, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 183 days.

This patent is subject to a terminal disclaimer.

(21) Appl. No.: 10/586,533

(22) PCT Filed: Feb. 8, 2005

(86) PCT No.: PCT/JP2005/002195

§ 371 (c)(1),
(2), (4) Date: Jul. 19, 2006

(87) PCT Pub. No.: WO2005/077532

PCT Pub. Date: Aug. 25, 2005

(65) Prior Publication Data

US 2007/0155626 A1    Jul. 5, 2007

(30) Foreign Application Priority Data

Feb. 17, 2004   (JP)   ............... 2004-040091

(51) Int. Cl.
*B01J 21/00* (2006.01)
*B01J 23/00* (2006.01)
*B01J 23/08* (2006.01)
*B01J 23/40* (2006.01)
*B01J 23/42* (2006.01)
*B01J 23/44* (2006.01)
*B01J 23/48* (2006.01)
*B01J 23/50* (2006.01)
*B01J 23/56* (2006.01)
*B01J 23/58* (2006.01)
*B01J 23/70* (2006.01)
*B01J 23/74* (2006.01)

(52) U.S. Cl. ............... 502/326; 502/258; 502/259; 502/260; 502/261; 502/263; 502/302; 502/303; 502/304; 502/327; 502/330; 502/332; 502/333; 502/334; 502/335; 502/336; 502/337; 502/338; 502/339; 502/348; 502/349; 502/350; 502/351; 502/355; 502/439

(58) Field of Classification Search ............... 502/258, 502/259, 260, 261, 262, 263, 302, 303, 304, 502/326, 327, 330, 332, 333, 334, 335, 336, 502/337, 338, 339, 348, 349, 350, 351, 355, 502/439
See application file for complete search history.

(56) References Cited

U.S. PATENT DOCUMENTS 2,980,662 A   4/1961   Jezl
(Continued)

FOREIGN PATENT DOCUMENTS

EP   0 466 984 A1   1/1992
(Continued)

OTHER PUBLICATIONS

U.S. Appl. No. 11/722,275, filed Jun. 20, 2007, Nakamura et al.
(Continued)

*Primary Examiner*—Cam N Nguyen
(74) *Attorney, Agent, or Firm*—Foley & Lardner LLP

(57) ABSTRACT

A method of producing catalyst powder of the present invention has a step of precipitating any one of a noble metal particle (5) and a transition metal particle (10) in a reversed micelle (1); a step of precipitating, in the reversed micelle (1) in which any one of the noble metal particle (5) and the transition metal particle (10) is precipitated, a porous support material (7) which supports the noble metal particle (5) and the transition metal particle (10); and a step of precipitating the other of the noble metal particle (5) and the transition metal particle (10) in the reversed micelle (1) in which any one of the noble metal particle (5).

6 Claims, 5 Drawing Sheets

U.S. PATENT DOCUMENTS

| | | | |
|---|---|---|---|
| 3,255,020 A | 6/1966 | Ferrell | |
| 3,266,477 A | 8/1966 | Stiles | |
| 3,271,322 A * | 9/1966 | Stiles | 502/159 |
| 3,357,916 A | 12/1967 | Smith | |
| 3,388,077 A * | 6/1968 | Hoekstra | 502/328 |
| 3,478,329 A | 11/1969 | De Rudnay | |
| 3,531,329 A | 9/1970 | Selwitz | |
| 3,649,566 A | 3/1972 | Hayes et al. | |
| 4,255,289 A * | 3/1981 | Balinsky et al. | 502/327 |
| 4,255,290 A | 3/1981 | Flagg et al. | |
| 4,261,862 A | 4/1981 | Kinoshita et al. | |
| 4,274,981 A | 6/1981 | Suzuki et al. | |
| 4,369,132 A | 1/1983 | Kinoshita et al. | |
| 4,374,046 A | 2/1983 | Antos | |
| 4,425,261 A | 1/1984 | Stenius et al. | |
| 4,440,874 A | 4/1984 | Thompson | |
| 4,444,721 A | 4/1984 | Ohkata | |
| RE31,719 E | 10/1984 | Sonetaka et al. | |
| 4,495,304 A | 1/1985 | Yoo et al. | |
| 4,539,311 A | 9/1985 | Harrison et al. | |
| 4,548,921 A | 10/1985 | Geus et al. | |
| 4,585,752 A * | 4/1986 | Ernest | 502/304 |
| 4,714,693 A | 12/1987 | Targos | |
| 4,716,087 A | 12/1987 | Ito et al. | |
| 4,738,947 A * | 4/1988 | Wan et al. | 502/304 |
| 4,758,418 A | 7/1988 | Yoo et al. | |
| 4,765,874 A | 8/1988 | Modes et al. | |
| 4,793,797 A * | 12/1988 | Kato et al. | 431/7 |
| 4,839,146 A | 6/1989 | Cho et al. | |
| 4,857,499 A * | 8/1989 | Ito et al. | 502/326 |
| 4,904,633 A | 2/1990 | Ohata et al. | |
| 4,969,265 A | 11/1990 | Ehara | |
| 5,039,647 A * | 8/1991 | Ihara et al. | 502/251 |
| 5,068,218 A | 11/1991 | Nishizawa | |
| 5,108,469 A | 4/1992 | Christ | |
| 5,112,787 A | 5/1992 | Falke et al. | |
| 5,122,496 A * | 6/1992 | Vorlop et al. | 502/245 |
| 5,248,650 A | 9/1993 | Sekiba et al. | |
| 5,318,757 A * | 6/1994 | Abe et al. | 422/174 |
| 5,395,406 A | 3/1995 | Clavenna et al. | |
| 5,427,989 A | 6/1995 | Kanesaka et al. | |
| 5,446,003 A | 8/1995 | Augustine et al. | |
| 5,516,741 A | 5/1996 | Gascoyne et al. | |
| 5,610,117 A * | 3/1997 | Horiuchi et al. | 502/324 |
| 5,622,048 A | 4/1997 | Aoyama et al. | |
| 5,640,847 A | 6/1997 | Nakajima et al. | |
| 5,644,912 A | 7/1997 | Kawamura | |
| 5,677,258 A | 10/1997 | Kurokawa et al. | |
| 5,750,458 A | 5/1998 | Kennelly et al. | |
| 5,814,576 A | 9/1998 | Yamamoto | |
| 5,814,577 A | 9/1998 | Park et al. | |
| 5,849,660 A | 12/1998 | Takemoto et al. | |
| 5,911,961 A | 6/1999 | Horiuchi et al. | |
| 5,916,839 A | 6/1999 | Pak et al. | |
| 5,977,012 A | 11/1999 | Kharas et al. | |
| 6,047,544 A | 4/2000 | Yamamoto et al. | |
| 6,057,263 A | 5/2000 | Takahashi et al. | |
| 6,066,410 A | 5/2000 | Auer et al. | |
| 6,066,587 A | 5/2000 | Kurokawa et al. | |
| 6,069,111 A | 5/2000 | Yamamoto et al. | |
| 6,080,371 A | 6/2000 | Tanabe et al. | |
| 6,083,467 A | 7/2000 | Takeshima et al. | |
| 6,107,239 A | 8/2000 | Qin et al. | |
| 6,110,862 A | 8/2000 | Chen et al. | |
| 6,172,000 B1 | 1/2001 | Chattha et al. | |
| 6,180,075 B1 | 1/2001 | Lindner et al. | |
| 6,221,805 B1 | 4/2001 | Yamashita et al. | |
| 6,228,800 B1 | 5/2001 | Yamaguchi et al. | |
| 6,284,201 B1 | 9/2001 | Buck | |
| 6,296,813 B1 | 10/2001 | Ishii et al. | |
| 6,306,794 B1 * | 10/2001 | Suzuki et al. | 502/304 |
| 6,335,305 B1 * | 1/2002 | Suzuki et al. | 502/325 |
| 6,370,870 B1 | 4/2002 | Kamijo et al. | |
| 6,440,378 B1 * | 8/2002 | Hirata et al. | 423/239.1 |
| 6,444,610 B1 | 9/2002 | Yamamoto | |
| 6,475,446 B1 | 11/2002 | Horiike et al. | |
| 6,503,862 B1 | 1/2003 | Yamamoto | |
| 6,511,642 B1 | 1/2003 | Hatanaka et al. | |
| 6,514,905 B1 | 2/2003 | Hanaki et al. | |
| 6,518,213 B1 | 2/2003 | Yamamoto et al. | |
| 6,569,803 B2 * | 5/2003 | Takeuchi | 502/328 |
| 6,589,901 B2 | 7/2003 | Yamamoto et al. | |
| 6,623,716 B2 | 9/2003 | Suga et al. | |
| 6,660,897 B1 | 12/2003 | Martchal-George et al. | |
| 6,680,279 B2 | 1/2004 | Cai et al. | |
| 6,729,125 B2 | 5/2004 | Suga et al. | |
| 6,756,336 B2 * | 6/2004 | Kasahara et al. | 502/65 |
| 6,764,665 B2 | 7/2004 | Deeba et al. | |
| 6,787,500 B2 | 9/2004 | Ito et al. | |
| 6,800,388 B2 | 10/2004 | Kaneko et al. | |
| 6,861,387 B2 | 3/2005 | Ruth et al. | |
| 6,887,443 B2 | 5/2005 | Suga et al. | |
| 6,887,444 B1 | 5/2005 | Yamamoto | |
| 6,896,857 B2 | 5/2005 | Nakamura et al. | |
| 6,926,875 B2 | 8/2005 | Hatanaka et al. | |
| 6,956,007 B2 * | 10/2005 | Cai et al. | 502/303 |
| 6,967,183 B2 * | 11/2005 | Hampden-Smith et al. | 502/101 |
| 7,029,514 B1 | 4/2006 | Yang et al. | |
| 7,041,866 B1 * | 5/2006 | Gillespie | 585/750 |
| 7,081,431 B2 * | 7/2006 | Yamashita et al. | 502/332 |
| 7,150,861 B2 * | 12/2006 | Morita et al. | 423/213.5 |
| 7,351,679 B2 * | 4/2008 | Eri et al. | 502/327 |
| 2001/0004832 A1 | 6/2001 | Hanaki et al. | |
| 2001/0006934 A1 | 7/2001 | Kachi et al. | |
| 2001/0021358 A1 | 9/2001 | Kikuchi et al. | |
| 2002/0045543 A1 | 4/2002 | Takatori et al. | |
| 2003/0004054 A1 | 1/2003 | Ito et al. | |
| 2003/0083193 A1 | 5/2003 | Takaya et al. | |
| 2003/0167752 A1 | 9/2003 | Niwa et al. | |
| 2003/0181316 A1 | 9/2003 | Hiramoto et al. | |
| 2004/0055280 A1 | 3/2004 | Nishizawa et al. | |
| 2004/0254069 A1 | 12/2004 | Ito | |
| 2005/0170958 A1 | 8/2005 | Kikuchi et al. | |
| 2005/0215429 A1 | 9/2005 | Wakamatsu et al. | |
| 2005/0221978 A1 | 10/2005 | Shiratori et al. | |
| 2007/0153390 A1 | 7/2007 | Nakamura et al. | |
| 2007/0155626 A1 | 7/2007 | Yasuda et al. | |
| 2007/0167319 A1 | 7/2007 | Shiratori et al. | |
| 2007/0203021 A1 | 8/2007 | Nakamura et al. | |
| 2007/0244001 A1 | 10/2007 | Wakamatsu et al. | |

FOREIGN PATENT DOCUMENTS

| | | |
|---|---|---|
| EP | 0 931 590 B1 | 7/1999 |
| EP | 0 940 176 A2 | 9/1999 |
| EP | 1 043 065 A1 | 10/2000 |
| EP | 1 494 304 A1 | 1/2005 |
| JP | 56-010333 A | 2/1981 |
| JP | 58-186441 A | 10/1983 |
| JP | 59-230639 A | 12/1984 |
| JP | 7-246343 A | 9/1995 |
| JP | 09-122492 A | 5/1997 |
| JP | 10-216517 A | 8/1998 |
| JP | 11-057473 A | 3/1999 |
| JP | 11-314035 A | 11/1999 |
| JP | 2000-001119 A | 1/2000 |
| JP | 2000-015098 A | 1/2000 |
| JP | 2000-042411 A | 2/2000 |
| JP | 2000-279824 A | 10/2000 |
| JP | 2000-296339 A | 10/2000 |
| JP | 2001-198466 A | 7/2001 |
| JP | 3251009 B2 | 11/2001 |
| JP | 2002-066335 A | 3/2002 |
| JP | 2002-102703 A | 4/2002 |

| | | | |
|---|---|---|---|
| JP | 2002-233755 A | 8/2002 | |
| JP | 2002-355558 A | 12/2002 | |
| JP | 2002-361086 A | 12/2002 | |
| JP | 2003-080077 A | 3/2003 | |
| JP | 2003-126694 A | 5/2003 | |
| JP | 2003-144923 A | 5/2003 | |
| JP | 2003-164764 A | 6/2003 | |
| JP | 2003-181290 A | 7/2003 | |
| JP | 2003-181293 A | 7/2003 | |
| JP | 2003-290658 A | 10/2003 | |
| JP | 2003-290667 A | 10/2003 | |
| JP | 2003-311128 A | 11/2003 | |
| JP | 2004-016838 A | 1/2004 | |
| JP | 2004-043217 A | 2/2004 | |
| JP | 2004-082000 A | 3/2004 | |
| JP | 2004-174490 A | 6/2004 | |
| JP | 2004-267961 A | 9/2004 | |
| JP | 2005-081183 A | 3/2005 | |
| JP | 2005-305300 A | 11/2005 | |
| WO | WO-95/32790 A1 | 12/1995 | |
| WO | WO-97/09114 A1 | 3/1997 | |
| WO | WO-2005/063390 A1 | 7/2005 | |
| WO | WO-2005/063391 A1 | 7/2005 | |

OTHER PUBLICATIONS

A. Martinez-Arias et al., "Study of the lean NOx reduction with C3H6 in the presence of water over silver/alumina catalysts prepared from inverse microemulsions," Applied Catalysts B: Environmental, vol. 28, 2000, pp. 29-41.

H. Wakamatsu et al., US PTO Office Action U.S. Appl. No. 11/578,295, filed Mar. 19, 2009, 8 pgs.

H. Wakamatsu et al., US PTO Office Action U.S. Appl. No. 11/578,295, filed Oct. 2, 2008, 15 pgs.

H. Wakamatsu, et al., US PTO Office Action U.S. Appl. No. 11/079,270, filed Mar. 4, 2009, 6 pgs.

H. Wakamatsu, et al., US PTO Office Action U.S. Appl. No. 11/079,270, filed May 12, 2008, 7 pgs.

H. Wakamatsu, et al., US PTO Office Action U.S. Appl. No. 11/079,270, filed Jul. 21, 2008, 5 pgs.

H. Wakamatsu, et al., US PTO Office Action U.S. Appl. No. 11/079,270, filed Aug. 25, 2008, 20 pgs.

K. Shiratori, et al., US PTO Office Action U.S. Appl. No. 10/584,346, filed Jul. 11, 2008, 5 pgs.

K. Shiratori, et al., US PTO Office Action U.S. Appl. No. 10/584,346, filed Nov. 18, 2008, 19 pgs.

K. Shiratori, et al., US PTO Office Action U.S. Appl. No. 11/079,377, filed Mar. 12, 2009, 7 pgs.

K. Shiratori, et al., US PTO Office Action U.S. Appl. No. 11/079,377, filed May 8, 2008, 6 pgs.

K. Shiratori, et al., US PTO Office Action U.S. Appl. No. 11/079,377, filed Jul. 28, 2008, 18 pgs.

M. Che et al., "A Study of the Chemisorption of Nitric Oxide on PdY Zeolite, Evidence for a Room Temperature Oxidative Dissolution of Pd Crystallities," The Journal of Physical Chemistry, vol. 60, No. 21, 1976, 11 pgs.

M. Nakamura et al., US PTO Office U.S. Appl. No. 10/589,890, filed Jul. 15, 2008, 5 pgs.

M. Nakamura et al., US PTO Office U.S. Appl. No. 10/589,890, filed Nov. 19, 2008, 13 pgs.

M. Nakamura et al., US PTO Office Action U.S. Appl. No. 10/584,243, filed Aug. 6, 2008, 5 pgs.

M. Nakamura et al., US PTO Office Action U.S. Appl. No. 10/584,243, filed Dec. 26, 2008, 24 pgs.

Ph. Buffat and J-P Borel, "Size effect on the melting temperature of gold particles," Physical Review A, Jun. 1976, vol. 13, No. 6, 12 pgs.

R. Willis, "Pumice, Porous Volcanic Rock," Online, XP002364316, URL:http://ceramic-materials.com/cermat/material/2009.html>.

S. Eriksson,et al., "Preparation of Catalysts from Microemulsions and Their Applications in Heterogeneous Catalysis," Applied Catalysis A: General, vol. 265, No. 2, Jul. 8, 2004, pp. 207-219.

T. Kinoshita et al., "Magnetic evaluation of nanostructure of gold—iron composite particles synthesized by a reverse micelle method," Journal of Alloys and Compounds, vol. 359, No. 1-2, Sep. 22, 2003, pp. 46-50.

T. Shimizu et al., "Size Evolution of Alkanethiol-Protected Gold Nanoparticles by Heat Treatment in the Solid State", J. Phys. Chem. B, 107, 2003, pp. 2719-2724.

W.Y. Kim et al., "Methanol synthesis from syngas over supported palladium catalysts prepared using water-in-oil microemulsion," Applied Catalysis A: General, vol. 169, 1998, pp. 157-164.

M. Nakamura et al., US PTO Notice of Allowance, U.S. Appl. No. 10/589,890, filed May 7, 2009, 13 pgs.

* cited by examiner

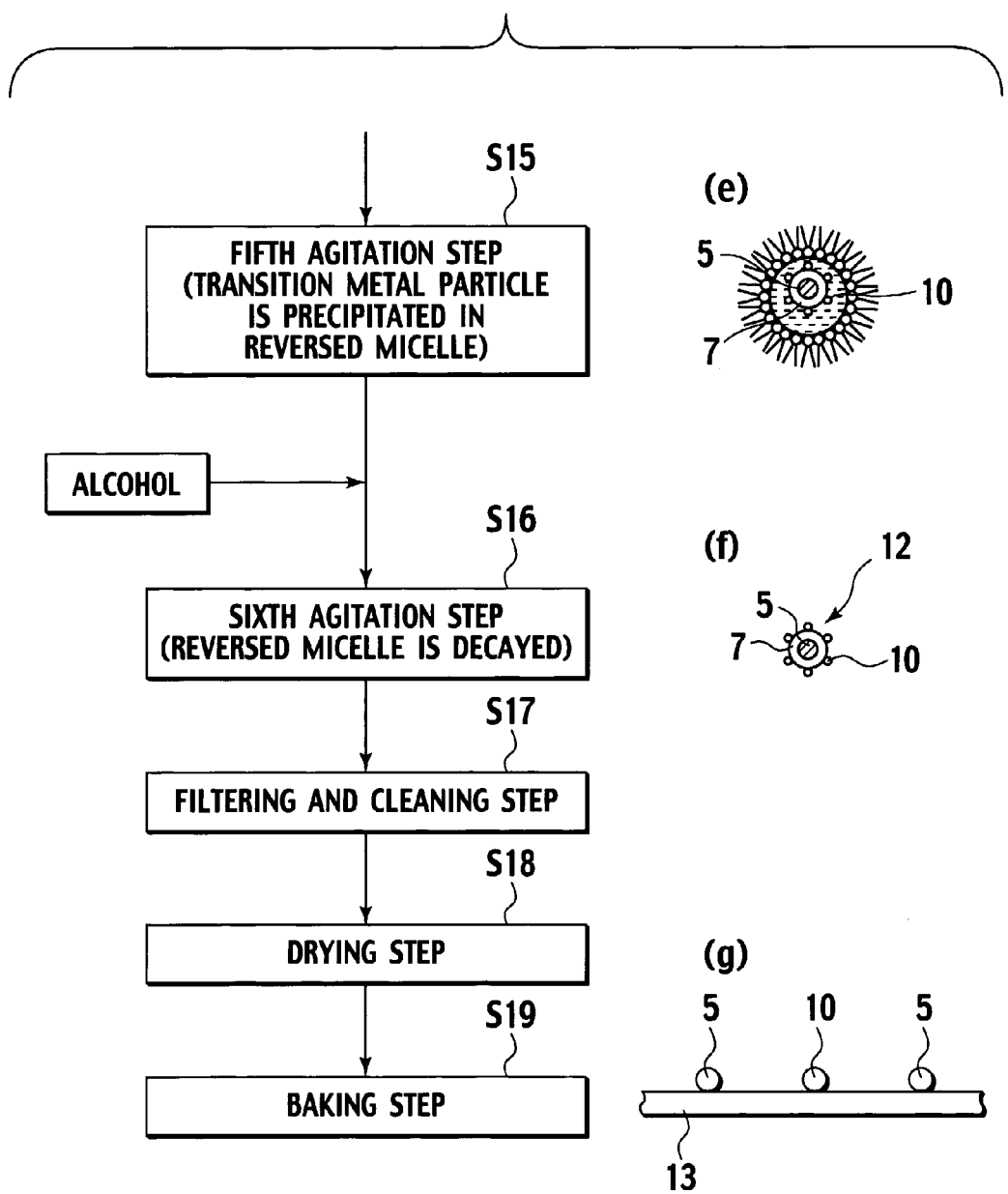

FIG.6

| | STRUCTURE | NOBLE METAL | | TRANSITION METAL | | ADDED ELEMENT IN SUBSEQUENT STEP | PRECURSOR OF POROUS OXIDE | COATING AMOUNT ON HONEYCOMB SUBSTRATE (g/L) | 50% DEGREE-OF-CONVERSION TEMPERATURE AFTER DURABILITY TEST OF 700°C×30 Hrs. | | |
|---|---|---|---|---|---|---|---|---|---|---|---|
| | | TYPE | SUPPORTED CONCENTRATION (%) | TYPE | SUPPORTED CONCENTRATION (%) | | | | HC | CO | NOx |
| EXAMPLE 1 | A/C/B | Pt | 1.00 | Co | 5.0 | - | ALUMINUM ISOPROPOXIDE | 100 | 279 | 222 | 261 |
| EXAMPLE 2 | B/C/A | Pt | 1.00 | Co | 5.0 | - | ALUMINUM ISOPROPOXIDE | 100 | 282 | 216 | 265 |
| EXAMPLE 3 | A/C/B | Pt | 1.00 | Fe | 5.0 | - | ALUMINUM ISOPROPOXIDE | 100 | 291 | 226 | 271 |
| EXAMPLE 4 | B/C/A | Pt | 1.00 | Fe | 5.0 | - | ALUMINUM ISOPROPOXIDE | 100 | 299 | 230 | 275 |
| EXAMPLE 5 | A/C/B | Pt | 1.00 | Co | 5.0 | Ce | ALUMINUM ISOPROPOXIDE | 100 | 272 | 209 | 256 |
| EXAMPLE 6 | B/C/A | Pt | 1.00 | Co | 5.0 | Ce | ALUMINUM ISOPROPOXIDE | 100 | 277 | 203 | 259 |
| COMPARATIVE EXAMPLE 1 | IMPREGNATED | Pt | 3.00 | Co | 5.0 | - | ALUMINUM OXIDE | 100 | 297 | 257 | 284 |
| COMPARATIVE EXAMPLE 2 | IMPREGNATED | Pt | 3.00 | Fe | 5.0 | - | ALUMINUM OXIDE | 100 | 315 | 261 | 288 |
| COMPARATIVE EXAMPLE 3 | IMPREGNATED | Pt | 3.00 | Co | 5.0 | Ce | ALUMINUM OXIDE | 100 | 292 | 243 | 267 | ized or reduces harmful gas (hydrocarbon (HC), carbon
CATALYST POWDER, EXHAUST GAS PURIFYING CATALYST, AND METHOD OF PRODUCING THE CATALYST POWDER

TECHNICAL FIELD

This invention relates to catalyst powder suitable for an exhaust gas purifying catalyst which purifies exhaust gas discharged from an internal combustion engine, and to a method of producing the catalyst powder.

BACKGROUND ART

As an exhaust gas purifying catalyst mounted on a vehicle and the like, a three-way catalyst has been known, which oxidizes or reduces harmful gas (hydrocarbon (HC), carbon monoxide (CO) and nitrogen oxide (NOx)) contained in exhaust gas, and converts the harmful gas into harmless water and gas. The three-way catalyst uses active alumina ($Al_2O_3$) having a large specific surface area as a support material, and supports noble metal particles of platinum (Pt), palladium (Pd), rhodium (Rh) and the like on a surface of the support material.

In recent years, emission control of the exhaust gas discharged from the vehicle and the like has been further tightened with the rise of ecological awareness, and accompanied with this, an improvement of the three-way catalyst has been advanced. For example, as an exhaust gas purifying catalyst excellent in purification performance for CO at low temperature, a catalyst which uses $CeO_2$ as a support material and supports platinum on a surface of the support material has been developed. Such a catalyst can purify the exhaust gas in a relatively short time from an engine start.

Moreover, a catalyst has been developed, which uses $CeO_2$—$ZrO_2$ exerting an oxygen storage capacity (OSC) as a support material, thereby expanding a stoichiometric range and enhancing exhaust gas purification efficiency. The OSC is a capability of adsorbing oxygen in a lean atmosphere containing relatively much $O_2$ and desorbing oxygen in a rich atmosphere containing much HC and CO. For example, an exhaust gas purifying catalyst has been disclosed, which supports palladium (Pd) on a complex oxide such as $CeO_2$—$ZrO_2$ to then form the catalyst, restricts sulfur poisoning and CO poisoning, and restricts sintering of the palladium, thereby enhancing a catalyst activity (refer to Japanese Patent Laid-Open Publication No. 2003-144923).

Furthermore, an exhaust gas purifying catalyst has been disclosed, which supports the noble metal and oxide particles of at least one metal selected from aluminum (Al), nickel (Ni) and iron (Fe) on the $CeO_2$—$ZrO_2$ complex oxide as the support material to then form the catalyst, and controls a movement of the noble metal by means of the oxide particles, thereby restricting growth of the particles of the noble metal (refer to Japanese Patent Laid-Open Publication No. 2003-126694).

DISCLOSURE OF THE INVENTION

The conventional exhaust gas purifying catalyst has an advantage in that it can restrict the sulfur poisoning and the CO poisoning. However, exhaust gas temperature has significantly risen as engine performance has improved and running speed of vehicles has increased in recent years, and accordingly, the current situation is that temperature of the exhaust gas purifying catalyst is apt to rise. Therefore, when the exhaust gas purifying catalyst is exposed to a high temperature for a long period, sintering of the supported noble metal particles occurs, and a specific surface area of the noble metal particles is reduced. Hence, the conventional exhaust gas purifying catalyst has had a possibility that catalyst performance thereof may be lowered.

Moreover, the conventional exhaust gas purifying catalyst has been prepared by use of an alkoxide method, a coprecipitation method and the like, and accordingly, has not been able to support the particle-shaped noble metal and transition metal on the support material in a dispersive manner. Therefore, when a CO component is increased in the exhaust gas flowing into the exhaust gas purifying catalyst, the CO covers surfaces of the noble metal and the transition metal. Hence, the conventional exhaust gas purifying catalyst has had a possibility that the catalyst performance thereof may be lowered because of reductions of active sites and CO selective oxidation sites.

The present invention is one made in order to solve the above-described problems. It is an object of the present invention to provide catalyst powder capable of maintaining initial purification performance thereof even if being exposed to the high temperature, a method of producing the catalyst powder, and an exhaust gas purifying catalyst using the catalyst powder.

The first aspect of the present invention provides catalyst powder comprising: a porous support material; and a noble metal particle and a transition metal particle, which are supported on the support material, wherein the noble metal particle and the transition metal particle are supported on a single particle of the support material, and the noble metal particle and the transition metal particle are supported at a predetermined interval.

The second aspect of the present invention provides a method of producing catalyst powder comprising: precipitating any one of a noble metal particle and a transition metal particle in a reversed micelle; precipitating, in the reversed micelle in which any one of the noble metal particle and the transition metal particle is precipitated, a porous support material which supports the noble metal particle and the transition metal particle; and precipitating the other of the noble metal particle and the transition metal particle in the reversed micelle in which any one of the noble metal particle and the transition metal particle is precipitated.

The third aspect of the present invention provides a method of producing catalyst powder comprising: preparing a reversed micellar solution having a reversed micelle which contains therein any one of a solution containing noble metal salt and a solution containing transition metal salt; precipitating any one of a noble metal particle and a transition metal particle in the reversed micelle by mixing a reducing agent into the reversed micellar solution; precipitating a support material in the reversed micelle by mixing a solution containing a support material precursor into the reversed micellar solution, after any one of the noble metal particle and the transition metal particle is precipitated; mixing the other of the solution containing the noble metal salt and the solution containing the transition metal salt into the reversed micellar solution, after the support material and any one of the noble metal particle and the transition metal particle are precipitated; and precipitating the other of the noble metal particle and the transition metal particle in the reversed micelle by mixing a reducing agent into the reversed micellar solution.

BRIEF DESCRIPTION OF THE DRAWINGS

FIGS. 3A and 3B are process charts explaining a method of producing catalyst powder according to the present invention;

FIG. 6 is a table showing evaluation results of Examples and Comparative examples.

BEST MODE FOR CARRYING OUT THE INVENTION

Figure 1:
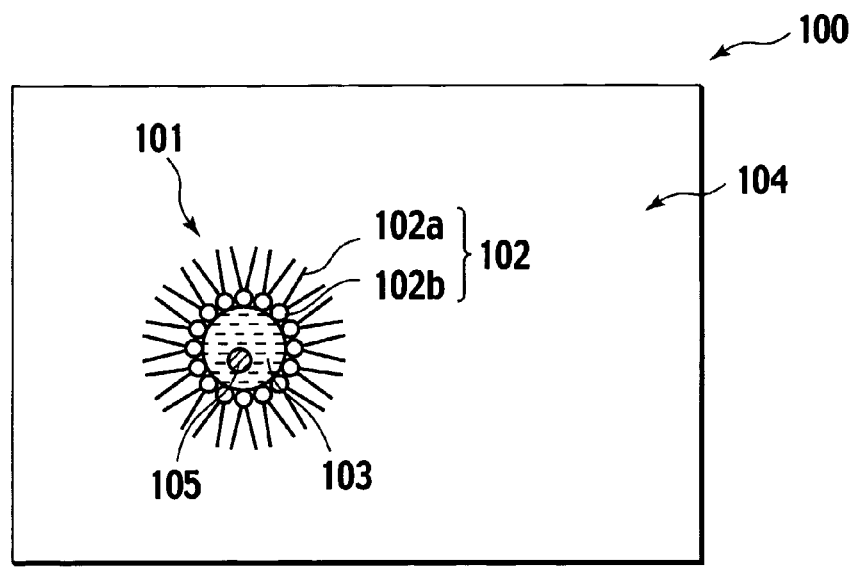
FIG. 1 is a view for explaining a reversed micellar solution.

Catalyst powder, an exhaust gas purifying catalyst, and a method of producing the catalyst powder, which are according to embodiments of the present invention, will be described below.

(Catalyst Powder)

In the catalyst powder according to the present invention, noble metal and transition metal are respectively dispersed on a single porous support material, and each of the noble metal and the transition metal is solely supported as particles thereon. Specifically, as shown in Illustration (g) of FIG. 3B, noble metal particles 5 and transition metal particles 10 are supported on a support material 13 in a dispersive manner at a predetermined interval. By adopting such a configuration, CO poisoning and sintering of the noble metal is restricted, thus making it possible to prevent a lowering of purification performance of the catalyst powder accompanied with a lowering of a catalyst activity of the noble metal. Moreover, the transition metal selectively oxidizes CO in exhaust gas to reduce CO adsorbed to the noble metal, and consequently, the catalyst activity of the noble metal is enhanced, and catalyst performance of the catalyst powder is improved. Detailed reasons why the CO poisoning of the noble metal can be restricted by addition of the transition metal are unclear. However, the following is conceived. Specifically, the transition metal forms an oxide and supply oxygen to CO in the exhaust gas, and consequently, the CO poisoning of the noble metal is reduced, thus making it possible to restrict the lowering of the catalyst performance.

Moreover, in the above-described catalyst powder, preferably, a particle diameter of the noble metal particles is within a range from 1 nm to 10 nm, and a particle diameter of the transition metal particles is 20 nm or less. By setting the particle diameters of the noble metal particles and the transition metal particles within the above-described ranges, specific surfaces areas thereof are increased to increase active sites and CO selective oxidation sites, resulting in that the catalyst performance can be enhanced. Note that the particle diameter of the noble metal can be obtained from observations using a laser diffraction/scattering method, an X-ray diffraction line broadening analysis and a transmission electron microscope, and the like.

Types of materials usable as the noble metal, the transition metal and the porous support material will be described below.

For the noble metal, it is preferable to use at least one selected from platinum (Pt), palladium (Pd), rhodium (Rh), iridium (Ir), ruthenium (Ru), osmium (Os) and gold (Au). For the transition metal, it is preferable to use at least one selected from manganese (Mn), iron (Fe), cobalt (Co), nickel (Ni), copper (Cu) and zinc (Zn). For the support material, it is preferable to use at least one selected from aluminum oxide ($Al_2O_3$), cerium oxide ($CeO_2$), zirconium oxide ($ZrO_2$), silicon oxide ($SiO_2$), titanium oxide ($TiO_2$), silica alumina, vanadium oxide and tungsten oxide.

Moreover, the noble metal to be selected is not limited to one type. Specifically, the catalyst powder can also be prepared in such a manner that Pt—Rh is made to exist in an inside or outside of the support material by use of an aqueous solution prepared by mixing platinum salt and rhodium salt in a single reversed micelle to be described later.

It is preferable that the above-described catalyst powder further contain a compound composed of at least one element selected from cerium (Ce), neodymium (Nd), praseodymium (Pr), lanthanum (La), zirconium (Zr), barium (Ba) and magnesium (Mg). Addition of the compound of such an element improves heat resistance of the support material, and accordingly, the sintering of the noble metal particles supported on the support material is restricted. Note that, after the catalyst powder is prepared, the element such as Ce, Nd, Pr, La, Zr, Ba and Mg may be impregnated thereinto, or that, when the reversed micelle is prepared, the above-described element may be precipitated in a similar way to the noble metal and the transition metal.

(Exhaust Gas Purifying Catalysts)

Next, an embodiment of the exhaust gas purifying catalyst according to the present invention will be described. The exhaust gas purifying catalyst according to this embodiment is characterized by including a catalyst layer containing the above-mentioned catalyst powder. In a common exhaust gas purifying catalyst, when carbon monoxide in the exhaust gas flowing into the catalyst is increased, the carbon monoxide covers a surface of the noble metal, and a function as a three-way catalyst is lowered. As opposed to this, in the catalyst powder according to the present invention, the transition metal and the noble metal are precipitated independently of each other onto the surface of the support material, and are supported thereon at the predetermined interval. Accordingly, the transition metal restricts the sintering of the noble metal. Moreover, CO in the exhaust gas is selectively oxidized to reduce CO to be adsorbed to the noble metal, and consequently, the catalyst activity of the noble metal is enhanced, and the catalyst performance is improved.

In the case of using the catalyst powder for the purpose as the exhaust gas purifying catalyst, it is preferable that the transition metal be cobalt when the noble metal is platinum. However, a multiplier effect of the noble metal and the transition metal can also be obtained by combinations of groups of the noble metal elements and the transition metal elements, which are described above, without being limited to such a combination of the platinum and the cobalt.

(Method of Producing Catalyst Powder)

Next, a method of producing catalyst powder according to the embodiment of the present invention will be described.

The method of producing catalyst powder according to the present invention is characterized by producing the catalyst powder by use of a reversed micelle method. Use of this method makes it possible to adjust a size of the metal particles, and to prepare catalyst powder of which particle diameter is even. In the reversed micelle method, a "reversed micellar solution" as shown in FIG. 1 is used. The reversed micellar solution is a solution composed of an organic solvent 104, an aqueous solution 103 containing noble metal ions, and amphiphiles 102 such as a surfactant. In the reversed micellar solution 100, the aqueous solution 103 and the amphiphiles 102 aggregate in the organic solvent 104, thus forming a reversed micelle 101. The aqueous solution 103 exists in an inside of the reversed micelle 101. In the organic solvent phase, each amphiphile 102 orients a hydrophobic group 102a to the outside, that is, to the organic solvent phase side, and orients a hydrophilic group 102b to the inside, that is, to the aqueous phase side. The orientations of the hydrophobic group 102a and the hydrophilic group 102b are reverse to those in the case of an aqueous solvent, and accordingly, this solution 100 is referred to as the reversed micellar solution. The reversed micellar solution as described above can be prepared by adding an aqueous solution to a solution having the amphiphiles dissolved in the organic solvent and by agitating an obtained mixture. A portion where the hydrophilic groups aggregate has a capability of holding polar molecules of water and the like. The aqueous solution concerned turns to extremely small droplets with a diameter of several nanometers to several ten nanometers, and is stably dispersed in the organic solvent. The size of the water droplets can be controlled by a molar ratio of injected water and the surfactant.

Figure 2:
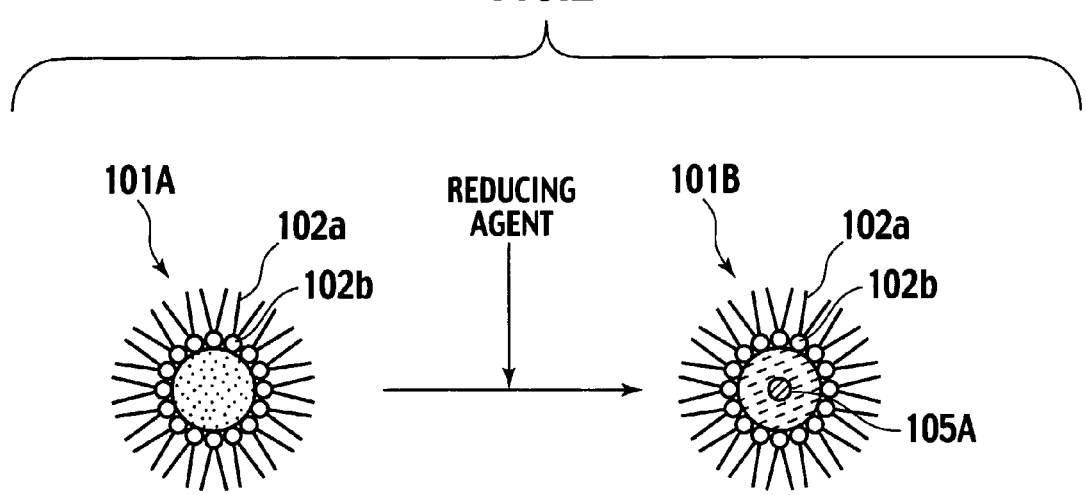
FIG. 2 is a view for explaining precipitation of a metal particle in an inside of a reversed micelle.

When a reducing agent which precipitates the noble metal ions is added to the reversed micellar solution 100 containing the noble metal ion aqueous solution 103 therein, the noble metal ions are reduced to the noble metal in the inside of the reversed micelle 101, and turn to a colloidal noble metal particle 105. The reducing agent may be added as an aqueous solution, or may be added as a reversed micellar solution containing the reducing agent concerned in insides of micelles. Specific description will be made by use of FIG. 2. FIG. 2 shows the case where the reducing agent is added as the aqueous solution. First, the surfactant 102 is mixed into the organic solvent, and the noble metal ion aqueous solution is added to a resultant. Then, a reversed micelle 101A is formed, in which the hydrophilic groups 102b are placed inside, and the hydrophobic groups 102a are placed outside. The noble metal ion aqueous solution is contained in the inside of the reversed micelle 101A. When the reducing agent is mixed into this reversed micellar solution, the reducing agent enters into the inside of the reversed micelle 101A, and a reduction reaction progresses in the reversed micelle 101A. Furthermore, when a particle 105A precipitated by reducing the noble metal ions is aged, a reversed micelle 101B containing the colloidal noble metal controlled by a micelle size can be obtained. Note that two or more types of the noble metal ions or precursors of the transition metal and the support material may be contained in the noble metal ion aqueous solution in the micelle. The inside of the micelle is excellent in dispersivity, and even if the two or more types of noble metal ions are contained therein, a noble metal particle having an extremely even composition can be obtained.

As opposed to this, an impregnation method which has heretofore been used for producing the catalyst powder is a method of supporting the noble metal, in which a solution containing the noble metal and the like is impregnated into pores of the support material to fix the noble metal to a pore wall, followed by drying and baking thereof. In the case of producing the catalyst powder by this impregnation method, the particle diameter of the noble metal becomes as extremely small as 1 nm or less, and heat resistance thereof is lowered. Meanwhile, the production of the catalyst powder by use of the reversed micelle method enables the particle diameter of the noble metal to be controlled to a size of 1 nm to 10 nm, and preferably, 3 nm to 8 nm. Moreover, it is made possible to control the size of the catalyst powder as a whole.

The method of producing catalyst powder according to the present invention is characterized by including a first step of first precipitating any one of a noble metal particle and a transition metal particle in a reversed micelle, a second step of precipitating a support material in the reversed micelle after the first step, and a third step of precipitating the other of the noble metal particle and the transition metal particle in the reversed micelle after the second step.

By using the production method of the present invention, as shown in Illustration (f) of FIG. 3, there can be obtained a complex compound composed in such a manner that the noble metal particle is included by the support material and the transition metal particles are supported on an outer shell of the support material including the noble metal particle, or a complex compound composed in such a manner that the transition metal particle is included by the support material and the noble metal particles are supported on the outer shell of the support material including the transition metal particle. When the complex compound having such a composition is baked after being filtered and dried, the noble metal particle or the transition metal particle which exists in the inside of the support material moves to the surface of the support material, and accordingly, the noble metal and the transition metal can be supported on the support material in the dispersive manner at the predetermined interval. Consequently, the CO poisoning of the noble metal is reduced, thus making it possible to restrict a lowering of the purification performance, which is accompanied with the lowering of the catalyst performance.

Moreover, in the production method of this application, the noble metal particle is precipitated in the first step, and then the support material is precipitated in the second step, and the transition metal particle is precipitated in the third step. Thus, the noble metal particle is included by the support material, and accordingly, aggregation of the noble metal can be restricted.

Furthermore, in the production method of this application, the following production order can also be established. Specifically, the transition metal particle is precipitated in the first step, and then the support material is precipitated in the second step, and the noble metal particle is precipitated in the third step. In such steps, the complex compound can be obtained, in which the transition metal particle is included by the support material, and the noble metal particle is supported on the outer shell of the support material. Also in the case of baking the complex compound, the catalyst powder in which the noble metal and the transition metal are dispersed on the support material at the predetermined interval can be obtained. Accordingly, the aggregation of the transition metal particles can be restricted, and the CO poisoning of the noble metal as an active site can be restricted.

Figure 3A:
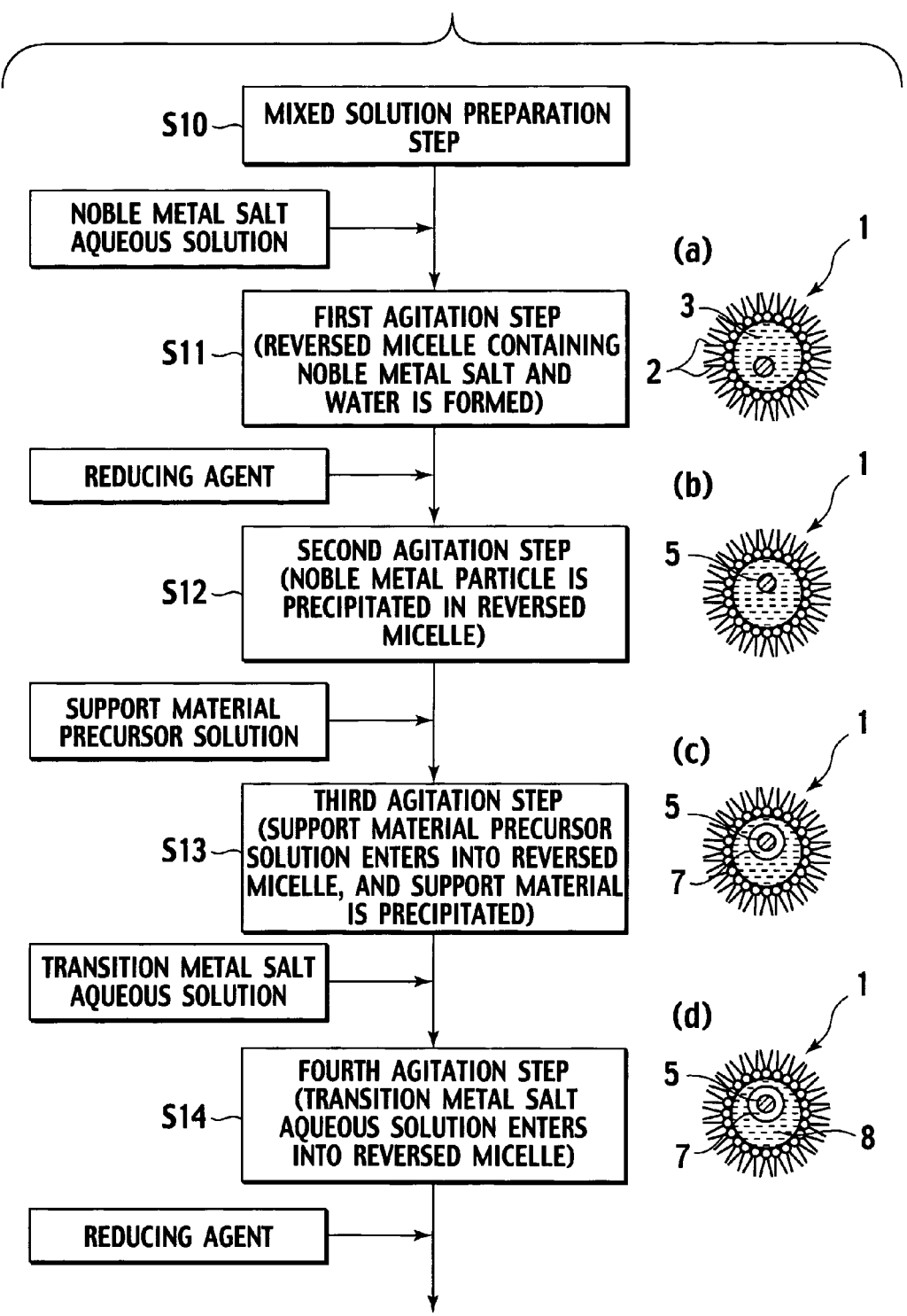

FIGS. 3A and 3B are process charts of the method of producing catalyst powder. Note that FIGS. 3A and 3B show an example of preparing the catalyst powder in such a manner that the noble metal is included by the support material and the transition metal is supported on the outer shell of the support material including the noble metal.

First, a solution in which the surfactant is dissolved in the organic solvent is prepared (Step S10). Into this mixed solution, an aqueous solution in which the noble metal salt as the precursors of the noble metal particles is dissolved is added, and an obtained mixture is agitated (Step S11). Thus, as shown in Illustration (a), a surfactant 2 is arrayed on the periphery of a spherical droplet with a size of a little more than ten nanometers, and a reversed micelle 1 containing an aqueous solution 3 which contains the noble metal salt is formed.

Next, a reducing agent is put into the mixed solution containing the reversed micelle, and an obtained mixture is agitated (Step S12). Thus, the reducing agent enters into the reversed micelle 1, and the noble metal ion is reduced to turn to the noble metal particle. Then, as shown in Illustration (b), a noble metal particle 5 is contained in the inside of the reversed micelle 1.

Thereafter, a solution containing a precursor of the support material is put into the above-described solution, and an obtained mixture is agitated (Step S13). Thus, the solution of the support material precursor enters into the reversed micelle. The solution enters into the reversed micelle, and thus the support material precursor is hydrolyzed. As shown in Illustration (c), a hydrolysate 7 of a metal alkoxide includes the noble metal particle 5 in the inside of the reversed micelle 1.

Moreover, a solution containing transition metal salt as the precursors of the transition metal particles is put into the mixed solution containing the reversed micelle, and an obtained mixture is agitated (Step S14). Thus, as shown in Illustration (d), a transition metal salt aqueous solution 8 enters into the inside of the reversed micelle 1.

Thereafter, the reducing agent is put into the mixed solution containing the reversed micelle, and an obtained mixture is agitated (Step S15). Thus, the reducing agent enters into the inside of the reversed micelle 1, and reduces the transition metal salt. Then, as shown in Illustration (e), transition metal particles 10 are supported on an outer shell of the hydrolysate 7 of the metal alkoxide in the inside of the reversed micelle 1.

Then, alcohol is put into the mixed solution containing the reversed micelle, and an obtained mixture is agitated (Step S16). When the alcohol is added, the droplet cannot maintain a shape thereof in the organic solvent. Accordingly, the reversed micelle decays. Then, as shown in Illustration (f), a complex compound 12 is obtained, in which the noble metal particle 5 is included by the hydrolysate 7, and the transition metal particles 10 are supported on the surface of the hydrolysate 7 of the metal alkoxide.

Next, the obtained complex component 12 is filtered by a membrane filter, and is then cleaned by alcohol and water. Thus, impurities (surfactant and the like) contained in such a precipitate are removed (Step S17). Moreover, the processed complex compound 12 is dried day and night (Step S18). After being dried, the complex compound 12 is baked (Step S19). Thus, as shown in Illustration (g), the catalyst powder can be obtained, in which the noble metal particles 5 and the transition metal particles 10 are supported on the support material 13 in the dispersive manner at the predetermined interval.

Note that, in the case of preparing the reversed micelle in Step S11 described above, preferably, a molar ratio RW (RW=[number of moles of water]/[number of moles of surfactant]) of the water included in the reversed micelle to the surfactant is set at 20 or less. The particle diameter of the noble metal particles is set at 5 nm or less by regulating the RW to be 20 or less, and the noble metal particles become fine particulates. Thus, the lowering of the catalyst activity can be prevented. As opposed to this, when the RW exceeds 20, a quantity of the water contained in the inside of the reversed micelle becomes too much, and the reversed micelle swells and becomes unstable. Consequently, the noble metal particles are inhibited from becoming fine particulates.

As the aqueous solution of the noble metal salt, a dinitrodiammine platinum (II) nitric acid solution, a hexachloroplatinate (IV) acid solution, a hexaammine platinum (IV) tetrachloride solution, a palladium chloride solution, a palladium nitrate solution, a dinitrodiammine palladium chloride solution, a rhodium chloride solution, a rhodium nitrate solution, a ruthenium chloride solution, a ruthenium nitrate solution, a hexachloroiridium acid solution, and the like are usable. As the transition metal salt, nitrate, chloride, acetate, amine compound and the like of the transition metal are usable. As the support material precursor, acetate, nitrate, metal alkoxide and the like are usable. For each of the noble metal salt and the support material precursor, a mixed solution of two or more of these materials may be used.

As the organic solvent of the reversed micellar solution, cyclohexane, methylcyclohexane, cycloheptane, heptanol, octanol, dodecyl alcohol, cetyl alcohol, isooctane, n-heptane, n-hexane, n-decane, benzene, toluene, xylene, and the like are usable. Moreover, a mixed solution of two types or more of these solvents may be used. For example, the reversed micellar solution may be prepared by use of solutions of the reversed micelle containing the noble metal and the reversed micelle containing the transition metal, which are different in oil phase from each other. As the surfactant of the reversed micellar solution, polyoxyethylene nonylphenyl ether, magnesium laurate, zinc caprate, zinc myristate, sodium phenylstearate, aluminum dicaprylate, tetraisoamylammonium thiocyanate, n-octadecyltri-n-butylammonium formate, n-amyltri-n-butylammonium iodide, sodium bis(2-ethylhexyl)succinate, sodium dinonylnaphthalenesulfonate, calcium cetylsulfate, dodecylamine oleate, dodecylamine propionate, cetyltrimethylammonium bromide, stearyltrimethylammonium bromide, cetyltrimethylammonium chloride, stearyltrimethylammonium chloride, dodecyltrimethylammonium bromide, octadecyltrimethylammonium bromide, dodecyltrimethylammonium chloride, octadecyltrimethylammonium chloride, didodecyldimethylammonium bromide, ditetradecyldimethylammonium bromide, didodecyldimethylammonium chloride, ditetradecyldimethylammonium chloride, (2-octyloxy-1-octyloxymethyl)polyoxyethylene ethyl ether, and the like are usable. Moreover, two or more of these surfactants may be used in a mixed manner.

As the reducing agent, usable are hydrazine, sodium borohydride, sodium thiosulfate, citric acid, sodium citrate, L-ascorbic acid, formic acid, formaldehyde, methanol, ethanol, ethylene, vitamin B and the like. Moreover, a mixed solution of two or more of these may be used.

Further specific description will be made below by use of Examples and Comparative examples.

EXAMPLE 1

Figure 4:
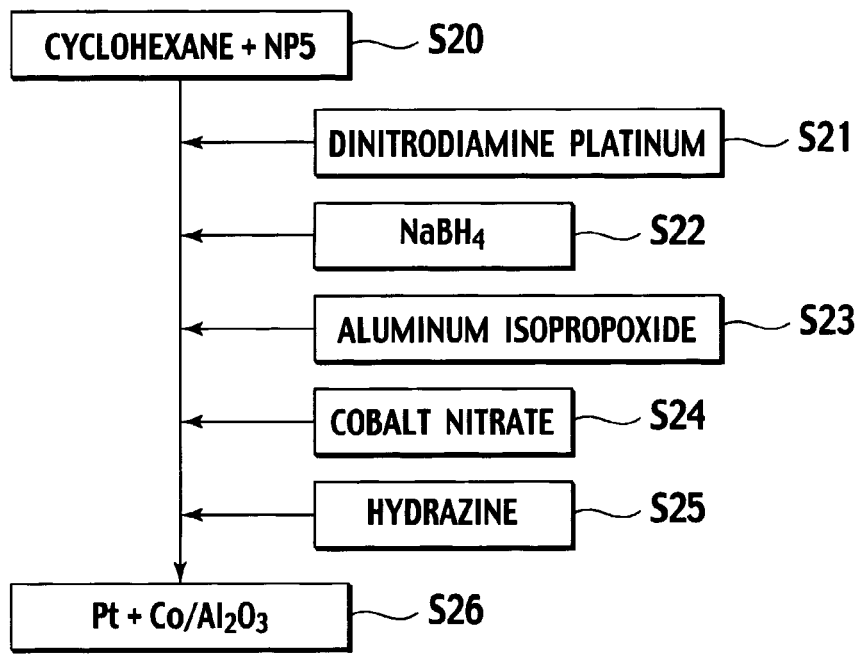
FIG. 4 is a chart showing a flow of a method of preparing catalyst powder in Example 1.

As shown in FIG. 4, 330 g of polyethylene glycol-mono 4-nonylphenyl ether (NP5) was added as the surfactant to 5 L of cyclohexane as the solvent (Step S20). Moreover, as the noble metal, 0.59 g of a 8.46% dinitrodiamine platinum solution diluted with 39.9 ml of ion-exchanged water was mixed into a solution obtained in Step S20 (Step S21). A mixture thus obtained was agitated for two hours, and a reversed micellar solution containing platinum ions was prepared.

Next, 0.0294 g of sodium borohydride was added in three steps (Step S22), the platinum ions were metalized, and a solution containing platinum particles in the reversed micellar solution was obtained.

As the support material precursor, 20 g of aluminum isopropoxide was dissolved in 20 ml of cyclohexane, and then an obtained mixture was dropped into the reversed micellar solution (Step S23). Thus, each platinum particle was included by aluminum hydride in the reversed micelle.

Into the solution in which each platinum particle was included by aluminum hydride in the reversed micelle, a solution in which 1.3 g of cobalt nitrate was dissolved as the transition metal in 26.54 ml of ion-exchanged water was added (Step S24), and a solution thus obtained was agitated for two hours.

Next, 0.67 g of hydrazine was dropped into the solution (Step S25), cobalt ions were metalized, and a complex compound with a structure of $Pt/Al(OH)_3/Co$ was formed in the reversed micellar solution (Step S26).

Then, 500 ml of methanol was added to the reversed micellar solution, and the reversed micelle was decayed. A resultant was filtered and dried, and then was baked in an atmosphere of 400° C. In such a way, catalyst powder which individually supported Pt of 1% by weight and Co of 5.0% by weight with respect to 1 g of $Al_2O_3$ was obtained.

EXAMPLE 2

Figure 5:
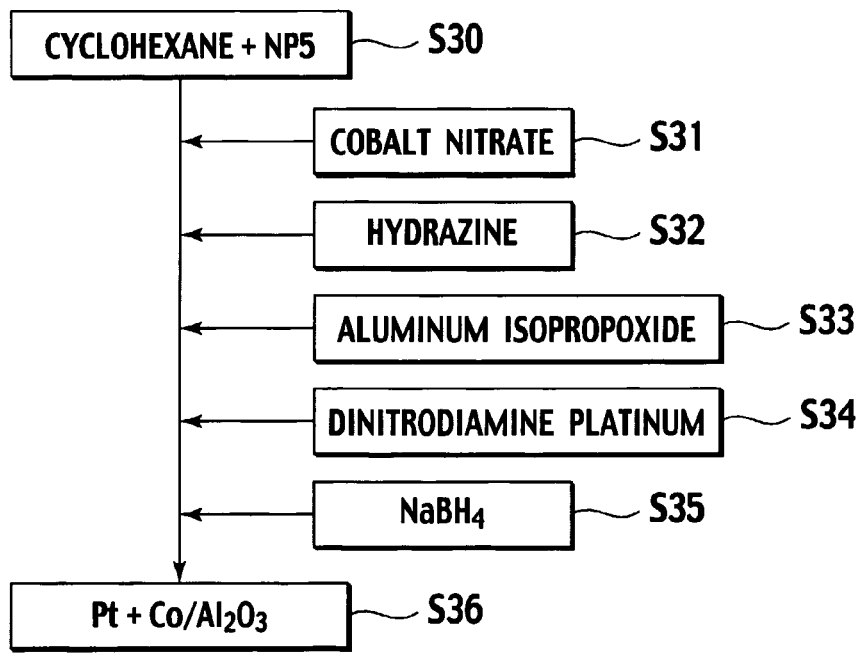
FIG. 5 is a chart showing a flow of a method of preparing catalyst powder in Example 2.

As shown in FIG. 5, 330 g of polyethylene glycol-mono 4-nonylphenyl ether (NP5) was added as the surfactant to 5 L of cyclohexane as the solvent (Step S30). Moreover, a solution in which 1.3 g of cobalt nitrate was dissolved as the transition metal in 26.54 ml of ion-exchanged water was mixed into a solution obtained in Step S30 (Step S31). A mixture thus obtained was agitated for two hours, and a reversed micellar solution containing cobalt ions was prepared.

Next, 0.67 g of hydrazine was dropped into the reversed micellar solution (Step S32), the cobalt ions were metalized, and a solution containing cobalt particles in the reversed micellar solution was obtained.

As the support material precursor, 20 g of aluminum isopropoxide was dissolved in 20 ml of cyclohexane, and then an obtained mixture was dropped into the reversed micellar solution (Step S33). Thus, each cobalt particle was included by aluminum hydride in the reversed micelle.

Into the solution in which each cobalt particle was included by aluminum hydride in the reversed micelle, as the noble metal, 0.59 g of a 8.46% dinitrodiamine platinum solution diluted with 39.9 ml of ion-exchanged water was added (Step S34), and a solution thus obtained was agitated for two hours.

Next, 0.0294 g of sodium borohydride was added in three steps (Step S35), platinum ions were metalized, and a complex compound with a structure of $Co/Al(OH)_3/Pt$ was formed in the reversed micellar solution (Step S36).

Then, 500 ml of methanol was added to the reversed micellar solution, and the reversed micelle was decayed. A resultant was filtered and dried, and then was baked in an atmosphere of 400° C. In such a way, catalyst powder which individually supported Pt of 1% by weight and Co of 5.0% by weight with respect to 1 g of $Al_2O_3$ was obtained.

EXAMPLE 3

Catalyst powder of Example 3 was prepared by similar steps to those of Example 1 except that the transition metal was changed from cobalt to iron.

First, 330 g of polyethylene glycol-mono 4-nonylphenyl ether (NP5) was added as the surfactant to 5 L of cyclohexane as the solvent. Moreover, as the noble metal, 0.59 g of a 8.46% dinitrodiamine platinum solution diluted with 39.9 ml of ion-exchanged water was mixed into a solution thus obtained. A mixture thus obtained was agitated for two hours, and a reversed micellar solution containing platinum ions was prepared.

Next, 0.0294 g of sodium borohydride was added in three steps, the platinum ions were metalized, and a solution containing platinum particles in the reversed micellar solution was obtained.

As the support material precursor, 20 g of aluminum isopropoxide was dissolved in 20 ml of cyclohexane, and then an obtained mixture was dropped into the reversed micellar solution. Thus, each platinum particle was included by aluminum hydride in the reversed micelle.

Into the solution in which each platinum particle was included by aluminum hydride in the reversed micelle, a solution in which 1.9 g of iron nitrate was dissolved as the transition metal in 26.3 ml of ion-exchanged water was added, and a solution thus obtained was agitated for two hours.

Next, 0.71 g of hydrazine was dropped into the solution, iron was metalized, and a complex compound with a structure of $Pt/Al(OH)_3/Fe$ was formed in the reversed micellar solution.

Then, 500 ml of methanol was added to the reversed micellar solution, and the reversed micelle was decayed. A resultant was filtered and dried, and then was baked in an atmosphere of 400° C. In such a way, catalyst powder which individually supported Pt of 1% by weight and Fe of 5.0% by weight with respect to 1 g of $Al_2O_3$ was obtained.

EXAMPLE 4

Catalyst powder of Example 4 was prepared by similar steps to those of Example 2 except that the transition metal was changed from cobalt to iron.

First, 330 g of polyethylene glycol-mono 4-nonylphenyl ether (NP5) was added as the surfactant to 5 L of cyclohexane of as the solvent. Moreover, a solution in which 1.9 g of iron nitrate was dissolved as the transition metal in 26.3 ml of ion-exchanged water was added to a solution thus obtained. A mixture thus obtained was agitated for two hours, and a reversed micellar solution containing iron ions was prepared.

Next, 0.71 g of hydrazine was dropped into the reversed micellar solution, iron ions were metalized, and a solution containing iron particles in the reversed micellar solution was obtained.

As the support material precursor, 20 g of aluminum isopropoxide was dissolved in 20 ml of cyclohexane, and then an obtained mixture was dropped into the reversed micellar solution. Thus, each iron particle was included by aluminum hydride in the reversed micelle.

Into the solution in which each iron particle was included by aluminum hydride in the reversed micelle, as the noble metal, 0.59 g of a 8.46% dinitrodiamine platinum solution diluted with 39.9 ml of ion-exchanged water was mixed.

Next, 0.0294 g of sodium borohydride was added in three steps, platinum ions were metalized, and a complex compound with a structure of $Fe/Al(OH)_3/Pt$ was formed in the reversed micellar solution.

Then, 500 ml of methanol was added to the reversed micellar solution, and the reversed micelle was decayed. A resultant was filtered and dried, and then was baked in an atmosphere of 400° C. In such a way, catalyst powder which individually supported Pt of 1% by weight and Fe of 5.0% by weight with respect to 1 g of $Al_2O_3$ was obtained.

EXAMPLE 5

Catalyst powder of Example 5 is one in which a cerium compound is further supported on the catalyst powder of Example 1.

Specifically, 330 g of polyethylene glycol-mono 4-nonylphenyl ether (NP5) was first added as the surfactant to 5 L of cyclohexane as the solvent. Moreover, as the noble metal, 0.59 g of a 8.46% dinitrodiamine platinum solution diluted with 39.9 ml of ion-exchanged water was mixed into a solution thus obtained. A mixture thus obtained was agitated for two hours, and a reversed micellar solution containing platinum ions was prepared.

Next, 0.0294 g of sodium borohydride was added in three steps, the platinum ions were metalized, and a solution containing platinum particles in the reversed micellar solution was obtained.

As the support material precursor, 20 g of aluminum isopropoxide was dissolved in 20 ml of cyclohexane, and then an obtained mixture was dropped into the reversed micellar solution. Thus, each platinum particle was included by aluminum hydride in the reversed micelle.

Into the solution in which each platinum particle was included by aluminum hydride in the reversed micelle, a solution in which 1.3 g of cobalt nitrate was dissolved as the transition metal in 26.54 ml ion-exchanged water was added, and a solution thus obtained was agitated for two hours.

Next, 0.67 g of hydrazine was dropped into the solution, cobalt ions were metalized, and a complex compound with a structure of Pt/Al(OH)$_3$/Co was formed in the reversed micellar solution.

Then, 500 ml of methanol was added to the reversed micellar solution, and the reversed micelle was decayed. A resultant was filtered and dried, and then was baked in an atmosphere of 400° C. In such a way, catalyst powder which individually supported Pt of 1% by weight and Co of 5.0% by weight with respect to 1 g of Al$_2$O$_3$ was obtained.

Moreover, cerium acetate was impregnated into the catalyst powder thus obtained so as to be 10% by weight in oxide conversion. A resultant was dried day and night at 120° C., and then was baked for one hour at 400° C.

EXAMPLE 6

Catalyst powder of Example 6 is one in which a cerium compound is further supported on the catalyst powder of Example 2.

Specifically, 330 g of polyethylene glycol-mono 4-nonylphenyl ether (NP5) was first added as the surfactant to 5 L of cyclohexane as the solvent. Moreover, a solution in which 1.3 g of cobalt nitrate was dissolved as the transition metal in 26.54 ml of ion-exchanged water was mixed into a solution thus obtained. A mixture thus obtained was agitated for two hours, and a reversed micellar solution containing cobalt ions was prepared.

Next, 0.67 g of hydrazine was dropped into the reversed micellar solution, the cobalt ions were metalized, and a solution containing cobalt particles in the reversed micellar solution was obtained.

As the support material precursor, 20 g of aluminum isopropoxide was dissolved in 20 ml of cyclohexane, and then an obtained mixture was dropped into the reversed micellar solution. Thus, each cobalt particle was included by aluminum hydride in the reversed micelle.

Into the solution in which each cobalt particle was included by aluminum hydride in the reversed micelle, as the noble metal, 0.59 g of a 8.46% dinitrodiamine platinum solution diluted with 39.9 ml of ion-exchanged water was added, and a solution thus obtained was agitated for two hours.

Next, 0.0294 g of sodium borohydride was added in three steps, platinum ions were metalized, and a complex compound with a structure of Co/Al(OH)$_3$/Pt was formed in the reversed micellar solution.

Then, 500 ml of methanol was added to the reversed micellar solution, and the reversed micelle was decayed. A resultant was filtered and dried, and then was baked in an atmosphere of 400° C. In such a way, catalyst powder which individually supported Pt of 1% by weight and Co of 5.0% by weight with respect to 1 g of Al$_2$O$_3$ was obtained.

Moreover, cerium acetate was impregnated into the catalyst powder thus obtained so as to be 10% by weight in oxide conversion. A resultant was dried day and night at 120° C., and then was baked for one hour at 400° C.

COMPARATIVE EXAMPLE 1

Dinitrodiamine platinum solution was impregnated with 100 g of alumina with a specific surface area of 200 m$^2$/g so that a supported concentration of Pt is 1.0% by weight. A resultant was dried day and night at 120° C., and then was baked for one hour at 400° C.

Moreover, a cobalt nitrate solution was impregnated with platinum-supporting powder so that a supported concentration of Co is 5.0% by weight. A resultant was dried day and night at 120° C., and then was baked for one hour at 400° C.

COMPARATIVE EXAMPLE 2

Dinitrodiamine platinum solution was impregnated with 100 g of alumina with a specific surface area of 200 m$^2$/g so that a supported concentration of Pt is 1.0% by weight. A resultant was dried day and night at 120° C., and then was baked for one hour at 400° C.

Moreover, a iron nitrate solution was impregnated with platinum-supporting powder so that a supported concentration of Co is 5.0% by weight. A resultant was dried day and night at 120° C., and then was baked for one hour at 400° C.

COMPARATIVE EXAMPLE 3

Dinitrodiamine platinum solution was impregnated with 100 g of alumina with a specific surface area of 200 m$^2$/g so that a supported concentration of Pt is 1.0% by weight. A resultant was dried day and night at 120° C., and then was baked for one hour at 400° C.

Moreover, a cobalt nitrate solution was impregnated with platinum-supporting powder so that a supported concentration of Co is 5.0% by weight. A resultant was dried day and night at 120° C., and then was baked for one hour at 400° C.

Furthermore, a cerium acetate solution was impregnated into catalyst powder thus obtained so that a supported concentration of cerium oxide is 10% by weight. A resultant was dried day and night at 120° C., and then was baked for one hour at 400° C.

Using each catalyst powder produced according to the above-described Examples 1 to 6 and Comparative examples 1 to 3, each 500 g of catalyst powder, 50 g of boehmite, and 1570 g of a 10% nitric acid solution were put into an alumina-made magnetic pot, and shaken and milled together with alumina balls. Thus, catalyst powder slurry was obtained. Moreover, each catalyst powder slurry was put into a cordierite-made honeycomb substrate (900 cell/2.5 mil), and excessive slurry was removed by an airflow, followed by drying at 120° C. and baking in an airflow of 400° C. In such a way, the respective catalysts of Examples 1 to 6 and Comparative examples 1 to 3 were produced.

A durability test to be described below was performed for each produced catalyst, and thereafter, performance thereof was evaluated.

In the durability test of the catalyst, a V6 engine made by Nissan Motor Co., Ltd. was used, and lead-free gasoline was used as fuel. In the durability test, a jig capable of adjusting a flow amount of exhaust gas to the honeycomb substrate was used. A position of the catalyst was adjusted such that temperature of an inlet of each catalyst of Examples 1 to 6 and Comparative examples 1 to 3 became 700° C., and the engine was operated for 50 hours.

Thereafter, the catalyst after the durability test was cut to set a catalyst volume at 40 cc, and temperature at which a degree of conversion (purification rate) for the exhaust gas became 50% was measured. Note that measurement conditions for the 50% degree-of-conversion temperature were as follows: an A/F ratio was stoichiometric; reaction gases with components shown in Table 1 were used; and a flow amount of each reaction gas was set at 40 L/min.

TABLE 1

| Composition | Concentration |
| --- | --- |
| NO | 1000 ppm |
| CO | 0.60% |
| $H_2$ | 0.20% |
| $O_2$ | 0.60% |
| $CO_2$ | 13.9% |
| HC | 1665 ppmC |
| $H_2O$ | 10% |
| $N_2$ | Rest |

Measurement results of the 50% degree-of-conversion temperatures of the respective catalysts are shown in FIG. 6. Note that representations in structure columns of FIG. 6 represent structures of the complex compounds, and specifically, represent orders of inner-support material metal/support material/outer-support material metal.

From FIG. 6, it was proven that the 50% degree-of-conversion temperature of each Example was lowered as compared with that of each Comparative example, and that the catalyst activity of each Example was high even after the durability test of the catalyst. Moreover, when comparing the respective Examples with one another, it was proven that, in both of the catalyst powders of Examples 5 and 6 in which Ce was added in the subsequent steps, the 50% degree-of-conversion temperatures were lower as compared with those of the other Examples, and that the catalyst activities were high. Furthermore, the following was proven. When comparing the respective catalyst powders of Examples 1 to 4 with one another, in the case where the structure of transition metal/support material/noble metal was formed in the reversed micellar solution to prepare the catalyst powder (Examples 2 and 4), the 50% degree-of-conversion temperatures after the durability test of the catalyst were slightly lower and the catalyst activities were higher as compared with that of the case where the structure of noble metal/support material/transition metal was contrarily formed to prepare the catalyst powder (Examples 1 and 3).

The entire content of a Japanese Patent Application No. P2004-040091 with a filing date of Feb. 17, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL ACTIVITY

According to the catalyst powder of the present invention, the noble metal and the transition metal are supported as the particles on the surface of the support material in the dispersive manner. Accordingly, the CO poisoning and sintering of the noble metal is restricted, thus making it possible to prevent the lowering of the purification performance, which is accompanied with the lowering of the catalyst activity. Moreover, according to the method of preparing catalyst powder of the present invention, the catalyst is prepared, in which the noble metal particle and the transition metal particle are separated from each other by the porous support material in the single reversed micelle. Accordingly, catalyst which disperses the noble metal and the transition metal on the surface of the support material and supports these metals as the particles thereon after the baking can be obtained.

The invention claimed is:

1. Catalyst powder, comprising:
   a porous support material; and
   a noble metal particle and a transition metal particle, which are supported on the support material,
   wherein the noble metal particle and the transition metal particle are supported on a single particle of the support material,
   the noble metal particle and the transition metal particle are separated from each other, and
   a diameter of the noble metal particle is within a range from 1 nm to 10 nm, and a diameter of the transition metal particle is 20 nm or less.
2. The catalyst powder of claim 1,
   wherein the noble metal is at least one selected from the group consisting of platinum, palladium, rhodium, iridium, ruthenium, osmium and gold.
3. The catalyst powder of claim 1,
   wherein the transition metal is at least one selected from the group consisting of manganese, iron, cobalt, nickel, copper and zinc.
4. The catalyst powder of claim 1,
   wherein the support material is at least one selected from the group consisting of aluminum oxide, cerium oxide, zirconium oxide, silicon oxide, titanium oxide, silica-alumina, vanadium oxide and tungsten oxide.
5. The catalyst powder of claim 1, further comprising:
   a compound composed of at least one selected from the group consisting of cerium, neodymium, praseodymium, lanthanum, zirconium, barium and magnesium.
6. The catalyst powder of claim 1,
   wherein the catalyst powder is used for purifying exhaust gas emitted from an internal combustion engine.

* * * * *